United States Patent [19]

Hjaeresen

[11] 4,344,596
[45] Aug. 17, 1982

[54] ADJUSTABLE ROLLER SUPPORT FOR A ROTARY DRUM

[75] Inventor: Paul T. Hjaeresen, Hillsdale, N.J.

[73] Assignee: F. L. Smidth & Co., Cresskill, N.J.

[21] Appl. No.: 146,222

[22] Filed: May 5, 1980

[30] Foreign Application Priority Data

May 9, 1979 [GB] United Kingdom ................. 7916050

[51] Int. Cl.³ ............................................ F16M 13/00
[52] U.S. Cl. .................................. 248/550; 432/103;
29/115; 248/661; 248/662; 248/666
[58] Field of Search .................. 248/65, 75, 550, 661,
248/662, 666; 432/103

[56] References Cited

U.S. PATENT DOCUMENTS

| 3,468,522 | 9/1969 | Bovagne | 432/103 X |
| 3,648,992 | 3/1972 | Durinck et al. | 432/103 X |
| 4,030,878 | 6/1977 | Kunath | 432/103 X |
| 4,171,949 | 10/1979 | Endersen et al. | 432/103 X |

Primary Examiner—Wayne L. Shedd
Attorney, Agent, or Firm—Pennie & Edmonds

[57] ABSTRACT

A rotary kiln having a live ring is supported by a pair of rollers on shafts. The ends of each shaft are supported by bearings carried at the ends of a weigh beam having a rocking bearing so that the rollers can tilt to follow changes in the slope of the kiln. To allow the rollers to follow any axial movement of the live ring, upon thermal expansion or contraction of the kiln, the rocking bearing is slidable on a partly cylindrical segment.

16 Claims, 5 Drawing Figures

ADJUSTABLE ROLLER SUPPORT FOR A ROTARY DRUM

TECHNICAL FIELD

This invention relates to a support for a rotary drum and more particularly to an adjustable roller support for a rotary kiln.

BACKGROUND ART

Roller supports for rotary kilns, e.g., British Patent Specification No. 1,527,419, are known in which the weigh beam can rock on its rocking bearing thus making it possible for the axis of the roller to always adjust itself automatically in accordance with the inclination of the axis of the live ring and consequently of the kiln. This ensures a complete line contact between the live ring and the roller support at all times, and thus minimal Hertz-stress between these parts.

However, it is known that the drums and especially rotary kilns undergo appreciable heat expansion in the axial direction. Because of this expansion at any rate, some of the live rings secured to the drum change their position in the axial direction in relation to the rollers of their roller supports since the rollers are normally incapable of a similar axial displacement. In the case of the above known support, the rollers are actually retained in position so as to avoid displacement. This is made possible by suspending their weigh beam in rocker arms which permit no such displacement. If the live ring is displaced in the axial direction it will thus only be in line contact with a certain part of each roller, which involves an unequal load on the latter as well as on the bearings thereof. If the rollers have not been constructed so as to be broader than the live ring, which in the event of axial displacement does not project beyond its rollers, there may further be an undesiredly large Hertz-stress between the roller and the live ring. I have eliminated the above-noted disadvantages of the known roller support.

DISCLOSURE OF THE INVENTION

The present invention relates to a roller support for supporting a rotary drum such as a rotary kiln, on a base support, the rotary drum having a live ring positioned around the rotary drum, comprising at least one roller in supporting engagement with the live ring, weigh beam means, means for mounting the at least one roller on the weigh beam means, rocking bearing means positioned between the weigh beam means and the base support so as to permit movement of the roller support generally along the direction of the longitudinal axis of the rotary drum, and means for driving the roller support in accordance with the axial displacement of the live ring.

In a preferred embodiment, the rocking bearing means comprises at least one rocking bearing member being generally circular and partly cylindrical and having a bearing surface, said rocking bearing member being positioned generally centrally of the weigh beam means for supporting engagement therewith, and at least one shell bearing member having the shape generally of an annular cylinder segment, said shell bearing member having a bearing surface capable of slidable engagement with the bearing surface of the rocking bearing member and a rocking surface in contact with the base support for rocking thereon. Preferably, the roller support comprises at least two rollers.

The driving means preferably comprises brackets secured to the weigh beam means and bearing against each side of the live ring such that any axial displacement of the live ring is transmitted to the weigh beam means and thereby the rollers. The roller support further comprises means for sensing the axial displacement of the live ring, the sensing means being coupled to the driving means in accordance with said axial displacement.

The present invention also relates to an adjustable roller support for supporting a rotary drum, such as a rotary kiln on a base support, the support comprising two rollers on which the drum is, in use, supported via a live ring, each roller having a shaft symmetrically supported by two bearings, one at each side of the roller, and mounted one at each end of a weigh beam which is centrally supported by a centrally substantially circularly partly cylindrical rocking bearing, characterized in that the rocking bearing rests in sliding engagment on the inner side of a bearing shell having the shape of an annular cylinder segment, the outer side of which rests on a horizontal base support so that the bearing shell rocks with the rocking bearing on the base, and driving means which are arranged to be actuated by the live ring, for causing the rocking bearing to slide over the bearing shell and thus follow any axial displacement of the live ring.

The present invention also relates to a rotary kiln having a rotary drum and a live ring positioned therearound, the rotary drum being supported on a base support by an adjustable roller support comprising at least one roller in supporting engagement with the live ring, weigh beam means, means for mounting the at least one roller on the weigh beam means, rocking bearing means positioned between the weigh beam means and the base support so as to permit movement of the roller support generally along the direction of the longitudinal axis of the rotary drum, and means for driving the roller support in accordance with the axial displacement of the live ring.

Thus a significant object of the present invention is achieved by supporting the rocking bearing of the supporting beam of a roller support of the kind described in sliding engagement on the inner side of a bearing shell having the shape of an annular cylinder segment. The outer side of the annular cylinder segment thus rests on the horizontal base support so that the bearing shell rocks with the rocking bearing on the base support. The driving means which is arranged to be actuated by the live ring, thus causes the rocking bearing to slide over the bearing shell, and thus follow any axial displacement of the live ring.

The roller support according to the present invention can thus at any time follow the axial displacement of the corresponding live ring, in such a manner as to constantly ensure an evenly distributed load on each roller and its bearing as well as a minimal Hertz-stress between roller and live ring. Furthermore the width of each roller need not be larger than that of the live ring, which means that the distance between the two bearings of the roller can be smaller than in the case of a broader roller. This enables a stiffer and stronger roller shaft to be used and consequently a more robust roller support. The need to rest the roller shaft in spherical bearings, which has been necessary until now because of the shaft deflection caused by the heavy load on the roller and its shaft, can be dispensed with, unless spherical bearings are necessary with a view to bearing adjustments. If the spherical bearings are left out, the shaft can be made yet thicker and stiffer without increasing the dimensions of the bearing housing.

The invention leads to minimum axial frictional forces arising between the live ring and roller as the latter follows the live ring in accordance with its axial displacement, if any. Such frictional forces, which derive from the longitudinal changes of the drum and develop, e.g., in case of stoppages of a rotary kiln, are notoriously very large. Normally, a rotary kiln is kept in position by a guide roller position abutting against the side of a live ring at one end of the kiln. In the event of strong axial frictional forces between live rings in other positions along the kiln and their rollers, the guide rollers can be exposed to such heavy loads that it will lead to rupture of the guide roller or of its base.

The roller support in accordance with the invention can be so designed that the two rollers thereof are supported by a common weigh beam having a rocking bearing under each roller, or that the two rollers are supported by a respective one of two separate weigh beams, which then are connected by tension cables or tension rods.

The driving means can be mechanical and comprise brackets secured to the weigh beam, and abutting against each side of the live ring. Such an arrangement ensures an easy transfer of the axial displacement of the live ring directly to the roller support.

Alternatively, the driving means can comprise jacks secured to the base with pistons of the jacks acting upon the weigh beam in the axial direction of the rollers, and being controlled by a sensor which is arranged to abut against an edge of the live ring. In this manner it is possible, without large loading on the sides of the live ring, to provide strong displacement forces by means of the jacks for displacing the weigh beam in the axial direction of the drum and rollers.

Thus, the roller supports can be controlled mechanically or hydraulically or in other suitable manners so as to avoid any undesired displacement transverse to the axes of the drum and the rollers.

BRIEF DESCRIPTION OF THE DRAWINGS

The present invention is described in detail below with reference to the drawings in which.

BEST MODE FOR CARRYING OUT THE INVENTION

Figure 1:
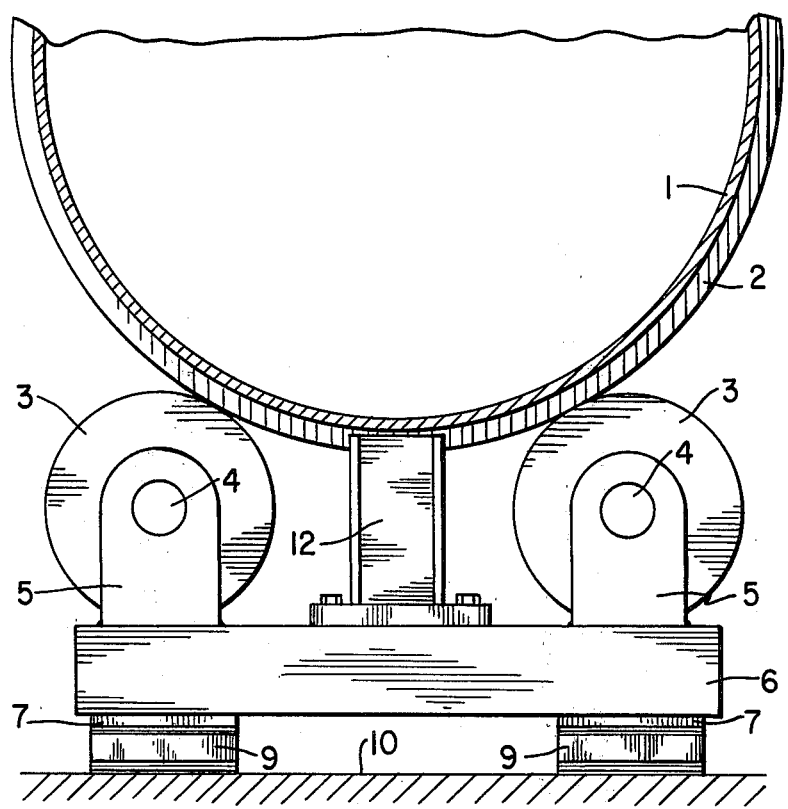
FIG. 1 is an end view of a rotary kiln illustrating a first embodiment of a roller support.
Figure 2:
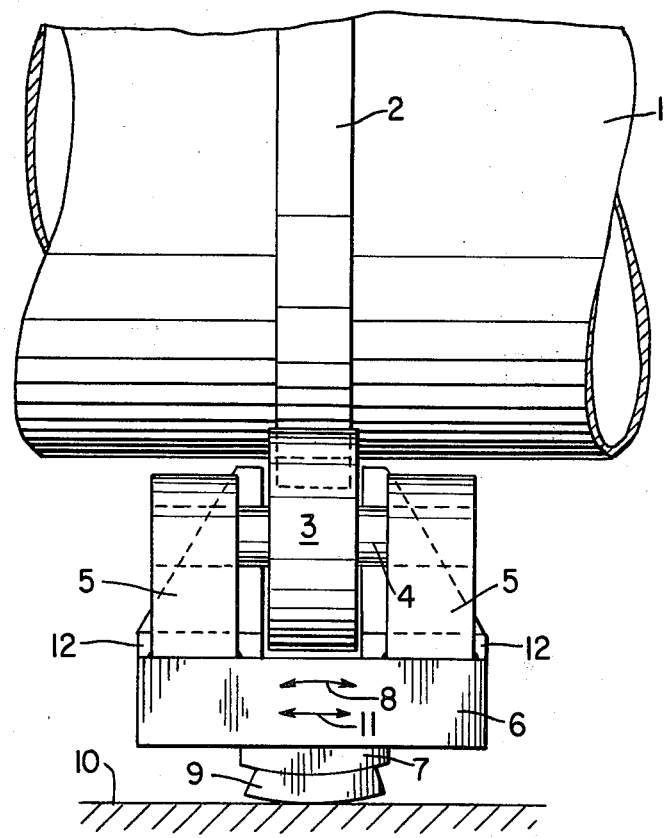
FIG. 2 is a vertical side view of the rotary kiln of FIG. 1.

Referring to the FIGS., a drum 1 is supported by means of a live ring 2 on two rollers 3 of a roller support assembly. The shaft 4 of each roller 3 rests in two bearings 5, one at each side of the roller. The bearings 5, as shown in FIG. 2, are mounted at each end of a weigh beam 6. As shown in FIG. 1, the weigh beam 6 may be common to both rollers of the roller support assembly.

Figure 3:
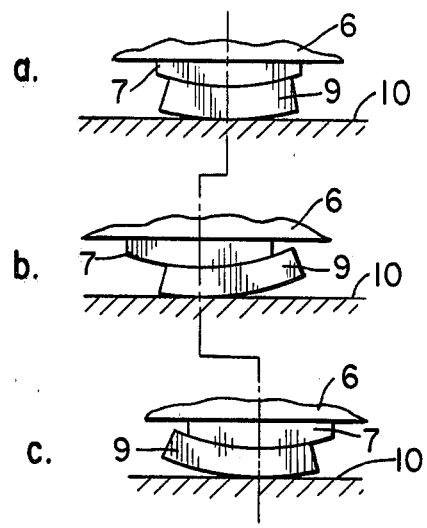
FIG. 3 illustrates the different axially displaced positions of the roller support of FIG. 1.

As seen in FIG. 1, the weigh beam 6 is supported on a base 10 under each roller 3 by a rocking bearing 7, thus allowing the weigh beam to rock as indicated by a double arrow 8 indicated in FIG. 2. In this manner, the roller will always adjust itself according to the inclination of the axis of of the live ring 2. The rocking bearing 7 bears against the inner side of an annular cylinder segment 9, the outer side of which rests on and may rock with the bearing 7 on the base 10. The combined rocking bearing 7 and cylinder segment 9 thus acts as the rocking bearing proper of the weigh beam 6. The inner side of the cylinder segment 9 is provided with a sliding surface, thus allowing the rocking bearing 7 to slide in the cylinder segment 9. In turn, this allows the weigh beam 6 to be displaced in the direction of the double arrow 11 indicated in FIG. 2. During this displacement, the cylinder segment 9 rocks on the base 10, while the rocking bearing 7 slides either towards the right or the left along the inner side of the cylinder segment 9 without rocking of the weigh beam 6, as illustrated in FIG. 3.

In order to transfer or transmit to the weigh beam 6 and consequently the roller 3 an axial displacement equal to that of the live ring 2, the embodiments illustrated in FIGS. 1 and 2 employ brackets 12 secured to the weigh beam 6 at each side of the live ring 2. The uppermost end of the brackets 12 abut against and are slidable along the sides of the live ring 2, as shown in FIG. 2.

Figure 4:
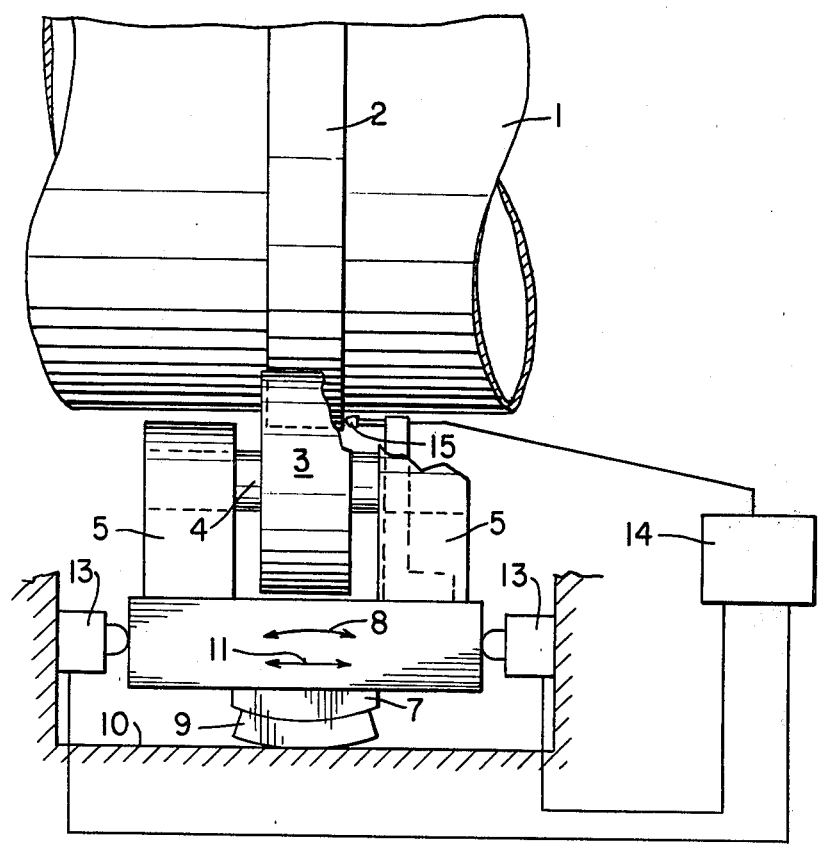
FIG. 4 is a vertical side view of a rotary kiln according to the present invention illustrating a second embodiment of a roller support.

The mechanical driving of the roller support assembly in accordance with the axial displacement of the live ring 2, as shown in FIGS. 1 and 2, can be replaced by other types of driving means. For example, as shown in FIG. 4, the weigh beam 6 can be acted upon at each end by a jack 13 which, by means of a control device 14, is controlled by a sensor 15. The sensor 15 senses the axial displacement of the live ring 2 and transfers this displacement to the weigh beam 6.

Figure 5:
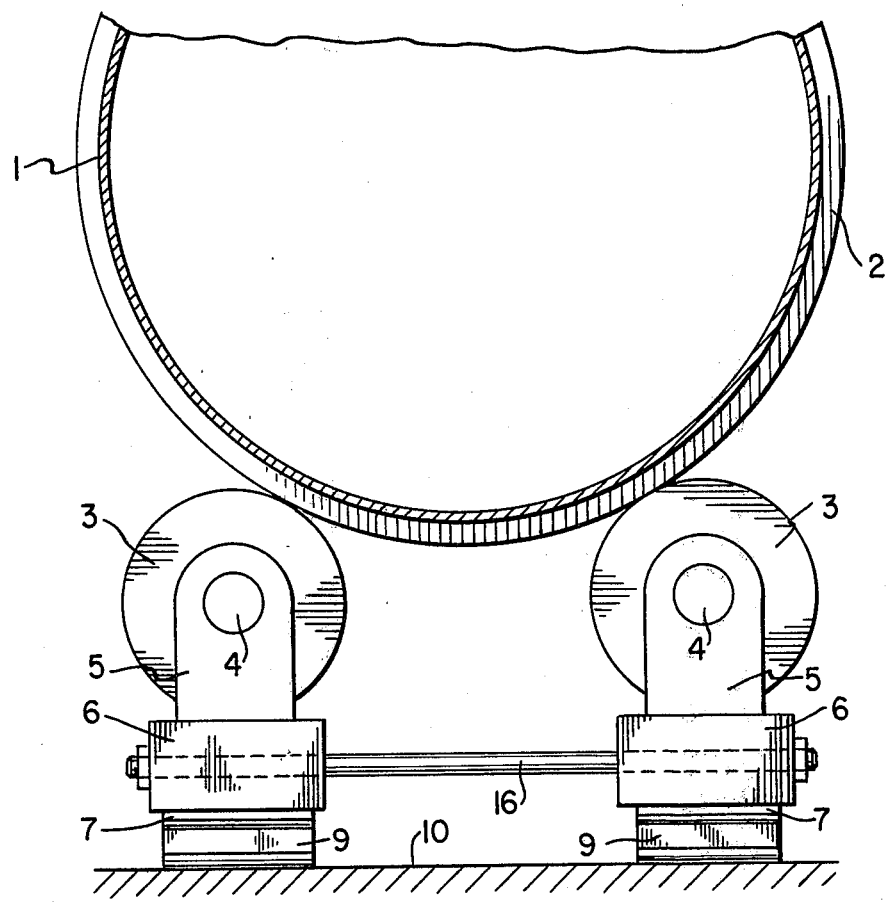
FIG. 5 is an end view of a rotary kiln according to the present invention illustrating a third embodiment of a roller support.
Figure 1:
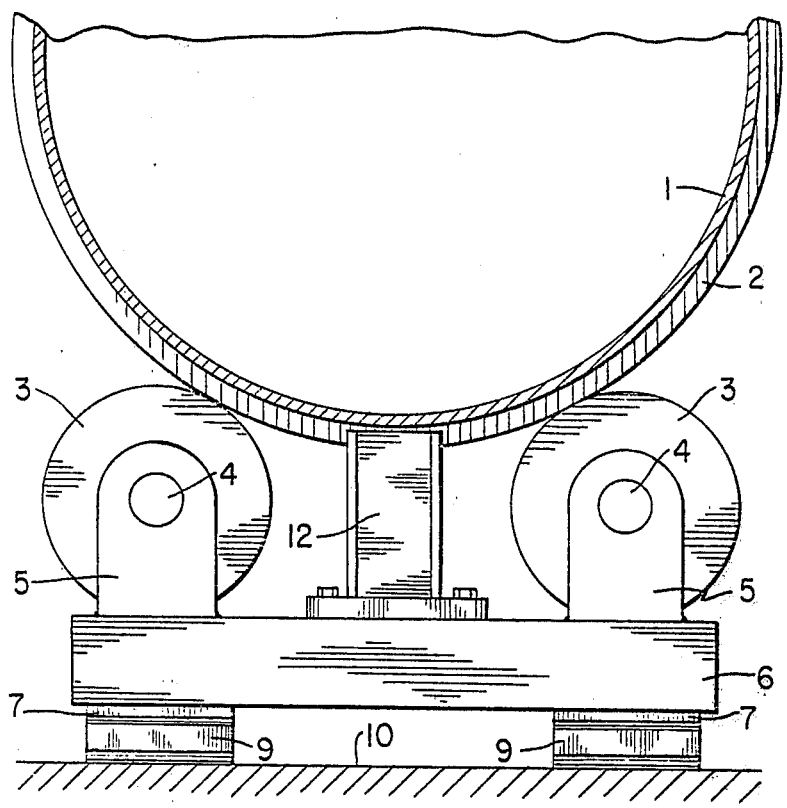
Figure 2:
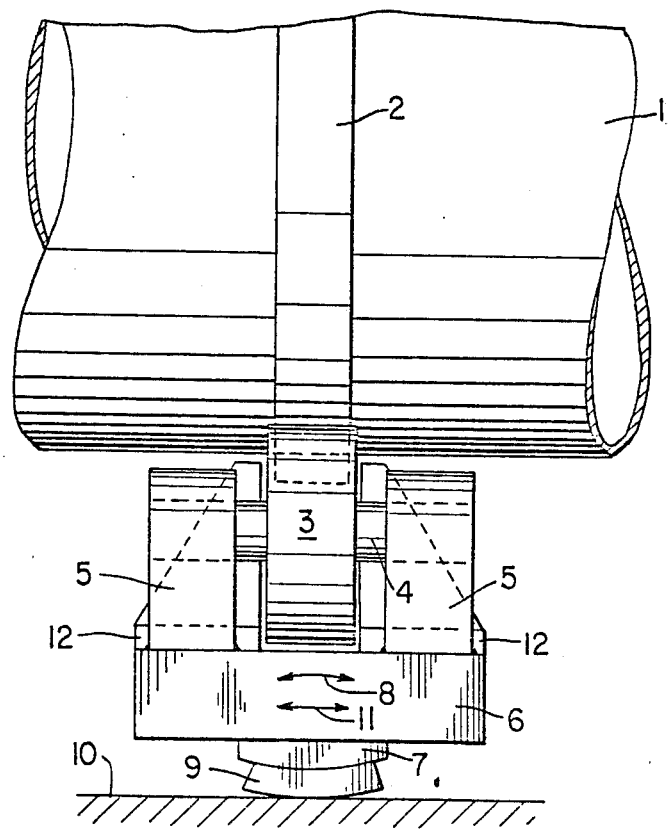

As described above, the roller support assembly of FIG. 1 consists of a weigh beam common to the two rollers 3. However, alternatively each roller 3 can have its own weigh beam 6' as shown in FIG. 5. But in such a case the two weigh beams 6' must be interconnected by means of tension cables or tension rods 16.

In yet other alternative embodiments, the inner sliding surface of the annular cylinder segment 9 can be a roller bearing surface, a hydrostatic bearing surface or other appropriate surface.

I claim:

1. A roller support for supporting a rotary drum on a base support, the rotary drum having a live ring positioned around the rotary drum, comprising at least one roller in supporting engagement with the live ring, weigh beam means, means for mounting the at least one roller on the weigh beam means, rocking bearing means positioned between the weigh beam means and the base support, said rocking bearing means being configured and dimensioned so as to permit rocking movement of said weigh beam means and also longitudinal movement of the roller support generally along the direction of the longitudinal axis of the rotary drum, and means for driving the roller support in accordance with the axial displacement of the live ring.

2. The roller support according to claim 1 wherein the rocking bearing means comprises at least one rocking bearing member being generally circular and partly cylindrical and having a bearing surface, said rocking bearing member being positioned generally centrally of the weigh beam means for supporting engagement therewith, and at least one shell bearing member having the shape generally of an annular cylinder segment, said shell bearing member having a bearing surface capable of slidable engagement with the bearing surface of the rocking bearing member and a rocking surface in contact with the base support for rocking thereon.

3. The roller support according to claim 2 comprising at least two rollers.

4. The roller support according to claim 3, wherein the two rollers are supported by a common weigh beam means in turn supported by separate rocking bearing means under each roller.

5. The roller support according to claim 3, wherein the weigh beam means includes two separate weigh beams connected by tension cables or rods, each weigh beam supporting one of the two rollers.

6. The roller support according to claims 4 or 5 wherein the driving means comprises brackets secured to the weigh beam means and bearing against each side of the live ring such that any axial displacement of the live ring is transmitted to the weigh beam means and thereby the rollers.

7. The roller support according to claims 4 or 5 further comprising means for sensing the axial displacement of the live ring, the sensing means being coupled to the driving means for controlling the driving means in accordance with said axial displacement.

8. The roller support according to claim 7 wherein the driving means comprises at least a pair of jacks mounted on the base support and having pistons capable of acting upon the weigh beam means in opposite axial directions of the rollers, the jacks being controlled by the sensor means.

9. The roller support according to claim 8 wherein the sensing means is arranged to abut against an edge of the live ring.

10. The roller support according to claim 6 wherein the bearing surface of the shell bearing means is a roller bearing surface.

11. The roller support according to claim 6 wherein the bearing surface of the shell bearing member is a hydrostatic thrust bearing surface.

12. The roller support according to claim 9 wherein the bearing surface of the shell bearing member is a roller bearing surface.

13. The roller support according to claim 9 wherein the bearing surface of the shell bearing member is a hydrostatic thrust bearing surface.

14. A roller support for supporting a rotary drum on a base support, the rotary drum having a live ring positioned around the rotary drum, comprising at least two rollers in supporting engagement with the live ring, weigh beam means, means for mounting the rollers on the weigh beam means, rocking bearing means positioned between the weigh beam means and the base support, said rocking bearing means being configured and dimensioned so as to permit rocking movement of said weigh beam means and also longitudinal movement of the roller support generally along the direction of the longitudinal axis of the rotary drum, and means for driving the roller support in accordance with the axial displacement of the live ring.

15. An adjustable roller support for supporting a rotary drum, such as a rotary kiln on a base support, the support comprising two rollers on which the drum is, in use, supported via a live ring, each roller having a shaft symmetrically supported by two bearings, one at each side of the roller, and mounted one at each end of a weigh beam which is centrally supported by a centrally substantially circularly partly cylindrical rocking bearing, characterized in that the rocking bearing is configured and dimensioned so as to permit rocking movement of said weigh beam and also longitudinal movement of the roller support generally along the direction of the longitudinal axis of the rotary drum, said rocking bearing resting in sliding engagement on the inner side of a bearing shell having the shape of an annular cylinder segment, the outer side of which rests on a horizontal base suppport so that the bearing shell rocks with the rocking bearing on the base support, and driving means which are arranged to be actuated by the live ring, for causing the rocking bearing to slide over the bearing shell and thus follow any axial displacement of the live ring.

16. A rotary kiln having a rotary drum and a live ring positioned therearound, the rotary drum being supported on a base support by an adjustable roller support comprising at least two rollers in supporting engagement with the live ring, weigh beam means, means for mounting the rollers on the weigh beam means, rocking bearing means positioned between the weigh beam means and the base support, said rocking bearing means being configured and dimensioned so as to permit rocking movement of said weigh beam means also longitudinal movement of the roller support generally along the direction of the longitudinal axis of the rotary drum, and means for driving the roller support in accordance with the axial displacement of the live ring.

* * * * *

UNITED STATES PATENT AND TRADEMARK OFFICE
CERTIFICATE OF CORRECTION

PATENT NO. : 4,344,596

DATED : August 17, 1982

INVENTOR(S) : Paul Torben Hjaeresen

It is certified that error appears in the above—identified patent and that said Letters Patent is hereby corrected as shown below:

In Column 3, line 13, "roller position abutting" should be --roller abutting--.

In Column 3, line 17, "rollers" should be --roller--.

In Column 4, line 34, "2, as shown in" should be --2, shown in--.

Signed and Sealed this

Ninth Day of November 1982

[SEAL]

Attest:

GERALD J. MOSSINGHOFF

Attesting Officer            Commissioner of Patents and Trademarks